No. 705,492. Patented July 22, 1902.
W. L. VOSS.
GEARING.
(Application filed July 2, 1901.)
(No Model.)

WITNESSES:
Edward Thorpe
J. B. Owens.

INVENTOR
William L. Voss
BY Munn & Co.
ATTORNEYS

UNITED STATES PATENT OFFICE.

WILLIAM L. VOSS, OF HARVEY, ILLINOIS.

GEARING.

SPECIFICATION forming part of Letters Patent No. 705,492, dated July 22, 1902.

Application filed July 2, 1901. Serial No. 66,818. (No model.)

*To all whom it may concern:*

Be it known that I, WILLIAM L. VOSS, a citizen of the United States, and a resident of Harvey, in the county of Cook and State of Illinois, have invented a new and Improved Gearing, of which the following is a full, clear, and exact description.

This invention relates to a gearing for driving at different speeds. It is particularly adaptable for use in connection with hoisting apparatus, as will be apparent hereinafter.

This specification is a specific description of one form of the invention, while the claims are definitions of the actual scope thereof.

Reference is to be had to the accompanying drawings, forming a part of this specification, in which similar characters of reference indicate corresponding parts in both views.

Figure 1:
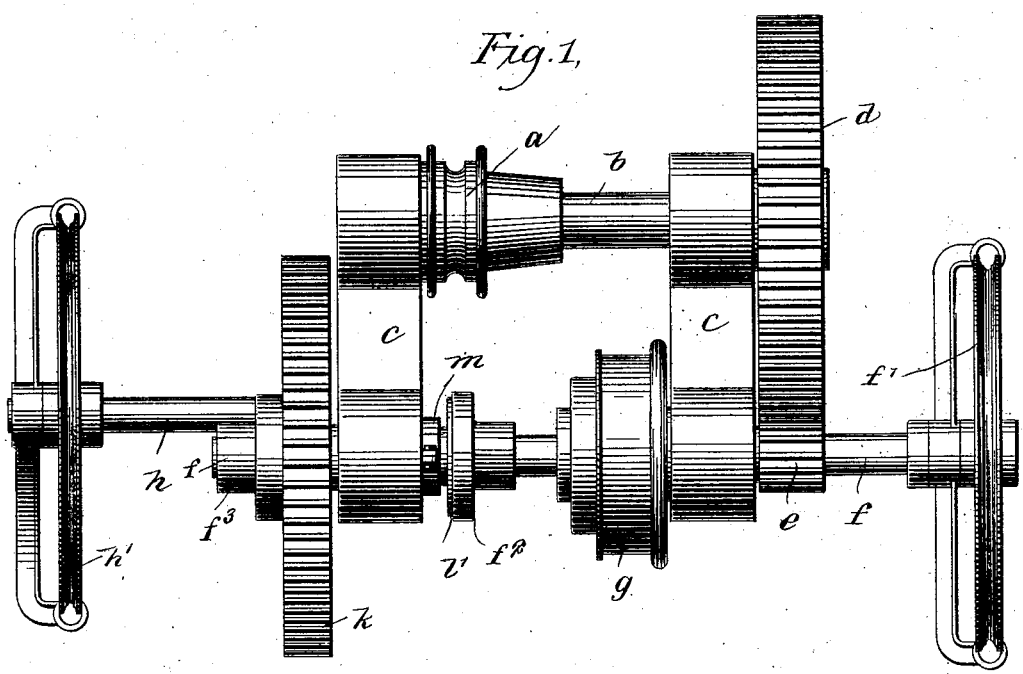
Figure 2:
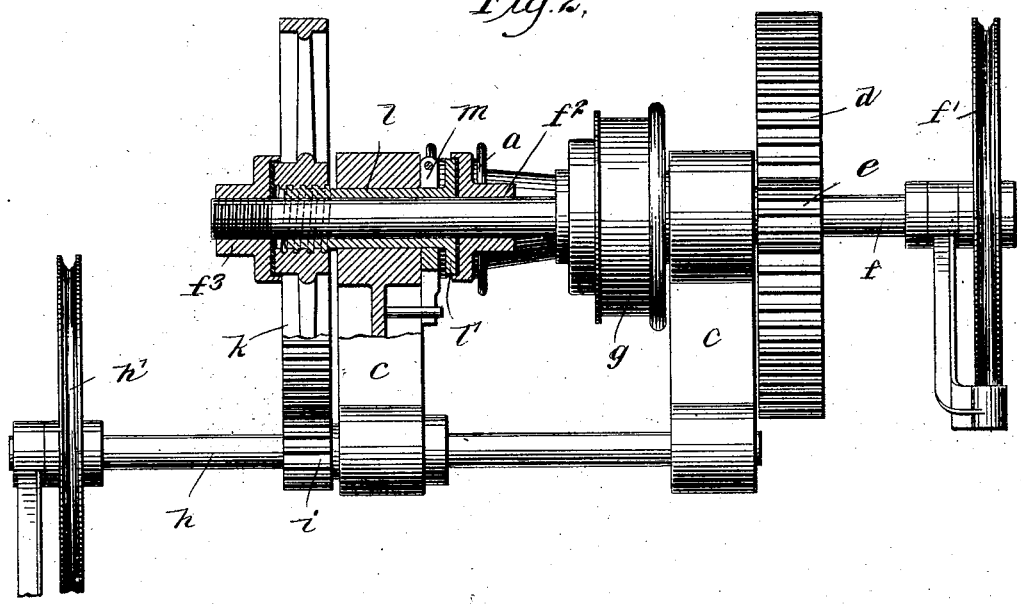

Figure 1 is a plan view of the invention, and Fig. 2 is a sectional side elevation thereof.

$a$ represents the element to be driven, which is here shown as a wheel or drum fastened on a shaft $b$, which in turn is revolubly carried in suitable frame elements $c$.

$d$ represents a spur-gear fast to the shaft $b$ and in mesh with a pinion $e$, fastened on a shaft $f$, revolubly mounted in the frame $c$. The shaft $f$ is provided with a sheave $f'$, adapted to carry a drive-chain, and it is also fitted with a friction device $g$, which prevents idle rotation of the shaft. The friction device $g$ may be of any form desired. It is here illustrated as a drum adapted to be engaged by a brake-strap.

$h$ represents a shaft revolubly mounted in the frame below the shafts $b$ and $f$ and having a sheave $h'$ to carry a drive-chain. Fastened to the shaft is a pinion $i$, in mesh with a spur-gear $k$, which is threaded on a sleeve $l$, fitted loosely on the shaft $f$ and mounted to turn freely in a part of the frame $c$. The sleeve $l$ has at its inner end a flange $l'$, which is adapted to coact with a collar $f^2$, fastened on the shaft $f$. The outer end of the shaft $f$ has a collar $f^3$, adapted to coact with the hub of the spur-gear $k$.

$m$ represents a friction device connected between a part of the frame $c$ and the sleeve $l$ and serving to prevent idle rotation of the latter.

$h'$ is the low-speed drive-pulley, and $f'$ the high-speed drive-pulley. To drive the element $a$ at low speed, the shaft $h$ should be turned so as to cause the spur $k$ to screw outward (to the left in Fig. 2) on the sleeve $l$. This binds the flange $l'$ against the collar $f^2$ and the hub of the spur-gear $k$ against the collar $f^3$. During the screwing movement of the spur-gear $k$ the friction device $m$ holds the sleeve $l$ and prevents idle rotation thereof. When the part $l'$ is properly engaged with the collar $f^2$, the spur-gear $k$ will then be rendered fast on the shaft $f$, and the movement of the shaft $h$ will be transmitted first to the shaft $f$ and then to the shaft $b$. To drive at high speed, the movement of the shaft $h$ should be slightly reversed, so as to return the spur-gear $k$ to its inactive position—that is to say, to screw it back on the sleeve $l$—thus disengaging the flange $l'$ from the collar $f^2$ and the spur-gear $k$ from the pulley $f'$. Then by applying movement to the collar $f^3$ the shaft $f$ may be driven directly, and through the gears $e$ and $d$ the shaft $b$ is driven.

Having thus described my invention, I claim as new and desire to secure by Letters Patent—

1. The combination with the element to be driven, of a drive-shaft geared directly thereto, a second drive-shaft independent of the first, and gearing connecting the two drive-shafts, said gearing embodying a clutch automatically operative upon the movement of the second shaft, whereby to connect or disconnect the shafts.

2. The combination of a rotary shaft, a sleeve mounted loosely thereon, a rotary member threaded on the sleeve and capable of movement to bind itself and the sleeve between two parts on the shaft, and means for driving said rotary member.

3. The combination of a revoluble shaft, a sleeve mounted loosely thereon, collars fastened to the shaft and between which collars the sleeve is located, a rotary member threaded on the sleeve, and means for driving the rotary member.

4. The combination with an element to be driven, of a shaft fastened thereto, a second shaft geared with the first-named shaft, a sleeve mounted loosely on the second shaft, collars fastened to the second shaft and between which collars the sleeve is located, a gear threaded on the sleeve at one end thereof, and a rotary driving member transmitting movement to the gear.

5. The combination with the element to be driven of a drive-shaft geared directly thereto, a second drive-shaft independent of the first, and gearing for transmitting from the second to the first drive-shaft, said gearing embodying a threaded member operative by the turning of the second drive-shaft and forming a clutch for completing the connection between the two shafts.

In testimony whereof I have signed my name to this specification in the presence of two subscribing witnesses.

WILLIAM L. VOSS.

Witnesses:
GEO. E. TISSEN,
GEORGE A. MAHAN.